United States Patent [19]

Sheldon

[11] 4,040,116

[45] Aug. 2, 1977

[54] POWER SUPPLY EMPLOYING A SHORT CIRCUIT DETECTOR

[75] Inventor: Donald Charles Sheldon, Glen Ellyn, Ill.

[73] Assignee: International Telephone and Telegraph Corporation, New York, N.Y.

[21] Appl. No.: 637,829

[22] Filed: Dec. 4, 1975

[51] Int. Cl.² .......................................... H02H 7/127
[52] U.S. Cl. ...................................... 361/18; 361/56; 361/90; 361/100; 363/51; 363/54
[58] Field of Search ........ 317/33 SC, 31, 16, 33 VR, 317/36 TD; 321/11, 14, 16, 18; 323/24, 22 SC

[56] References Cited

U.S. PATENT DOCUMENTS

| | | | |
|---|---|---|---|
| 3,394,299 | 7/1968 | Lawn et al. | 321/14 X |
| 3,491,370 | 1/1970 | Donner et al. | 317/33 SC X |
| 3,518,490 | 6/1970 | Wattson | 317/33 SC X |
| 3,525,921 | 8/1970 | Wattson | 321/18 |
| 3,743,887 | 7/1973 | Keough et al. | 317/16 |
| 3,816,810 | 6/1974 | Friedman et al. | 321/11 X |
| 3,818,272 | 6/1974 | Rich | 317/33 SC X |
| 3,848,175 | 11/1974 | Demarest | 321/14 X |
| 3,947,748 | 3/1976 | Klein | 321/11 |

*Primary Examiner*—J D Miller
*Assistant Examiner*—Patrick R. Salce
*Attorney, Agent, or Firm*—J. B. Raden; M. M. Chaban

[57] ABSTRACT

A short circuit detector is provided for a compact power supply system in which a plurality of power supplies may be operated in parallel. The detector senses when a voltage drop in a bus indicates a possible short and then energizes solid state devices to turn the system off for a prescribed period of time. After the prescribed period of time has passed, the system will attempt to restart. If the ground has been cleared, system operation will be restored. If not, the system will again be shut down for the prescribed period.

3 Claims, 10 Drawing Figures

POWER SUPPLY EMPLOYING A SHORT CIRCUIT DETECTOR

BACKGROUND OF THE INVENTION

1. Field of the Invention

A solid state power supply is disclosed which includes a novel short circuit detector. The detector includes circuits responsive to low potentials indicative of a short to shut the power supply off for a brief period. The detector allows the power to be restored after a short time and will again shut it off in case a short is indicated.

2. Description of the Prior Art

The prior art includes power supplies for telephone switching systems and the like which involve the use of solid state devices. A variety of safety devices have been employed in such power supplies to prevent damage to the supplies in the event of a short circuit. These safety devices commonly include electromechanical devices.

An example of such devices in the prior art is disclosed in U.S. Pat. No. 3,743,887 for a "Power Supply for an Electronic PABX" which issued on July 3, 1973 in the names of T. J. Keough and C. J. Kalensky, and is assigned to the same assignee as the present invention. The system referred to in the patent includes electronic sensing devices which are coupled to a current sensitive relay which responds to excessive current flow to close contacts and supply a voltage causing the system to shut down.

In the prior art, involving the use of two or more switching bays in a system, the power supplies have sometimes been inadequately protected by short circuit detectors in each bay. For example, current may flow on a power distribution bus between the bays at excessive levels after one of the power supplies is shut down.

SUMMARY OF THE INVENTION

An object of the present invention is to provide improved means for protecting a distribution bus in case a short circuit develops on the bus. A related object is to provide a short circuit protection device which automatically turns a single power supply off and also turns the power supplies off in a system for a prescribed period in case of a short and then restores the supply or the supplies in the system to a condition from which the system can again attempt to restart.

To attain the foregoing and related objects, a short circuit detector is provided to turn off the power supply in response to a drop in the voltage level on a bus. Voltage on the bus is built up through power SCR's when the system is turned on. A slow start capacitor is also charged up as the power supply is energized. If the voltage on the bus subsequently decreases below a particular level, thereby indicating the existence of a short condition, ground sensing transistors cause the capacitor to discharge. As the capacitor discharges, intermediate circuits are activated and an SCR gate assembly turns off the power thereby shutting the power supply off. The power supply is shut off for a prescribed period of a few seconds as the capacitor discharges, after which it is again cleared for an attempt at restarting. If the ground is cleared, system operation will be restored. If not, the system is again shut down for the prescribed period.

A short circuit detector in accordance with the invention may be employed with the power supply for each bay of a multiple-bay telephone switching system. In such a multiple-bay arrangement, when a short is detected by one detector, a connection is completed over a slow start discharge multiple interconnecting the short circuit detector in each of the associated bays causing the power supply in each bay to be shut down. In this way, continued operation of the system is stopped, and excessive current in the system is diminished.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which

FIG. 4a illustrates voltage waveforms at the emitter of the oscillator and FIG. 4b represents the 30 volt supply waveform and its synchronization to the waveform of FIG. 4a, and FIGS. 5b and 5c show the cathode, or output, potentials of control SCR's used to control the power SCR's, while

DESCRIPTION OF A PREFERRED EMBODIMENT

Figure 1:
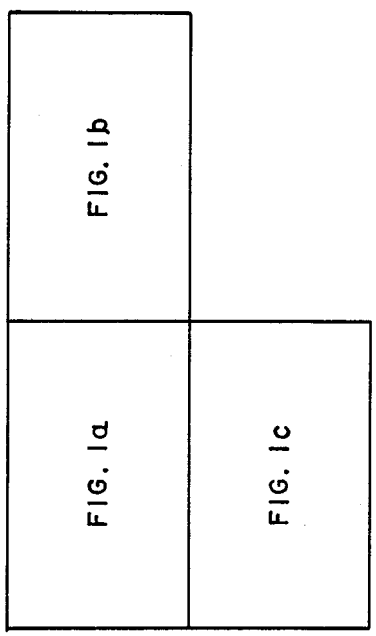
FIG. 1 shows how FIGS. 1a, 1b and 1c should be combined, FIGS. 2a and 2b, respectively illustrate the waveforms at the outputs of power SCR's used in the circuits under no-load and load conditions, respectively.
Figure 1B:
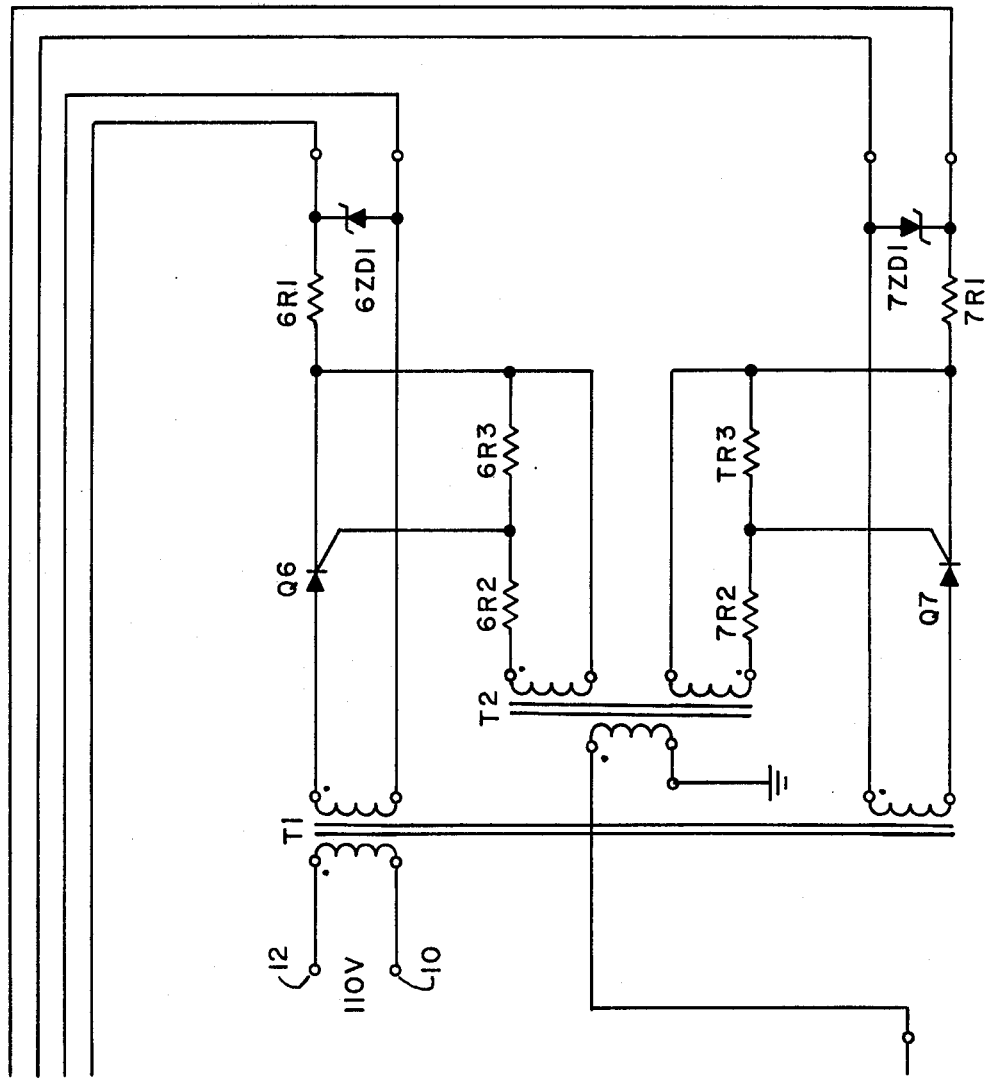
FIG. 1b illustrates a gate circuit assembly of use in providing control of the power supply.
Figure 1A:
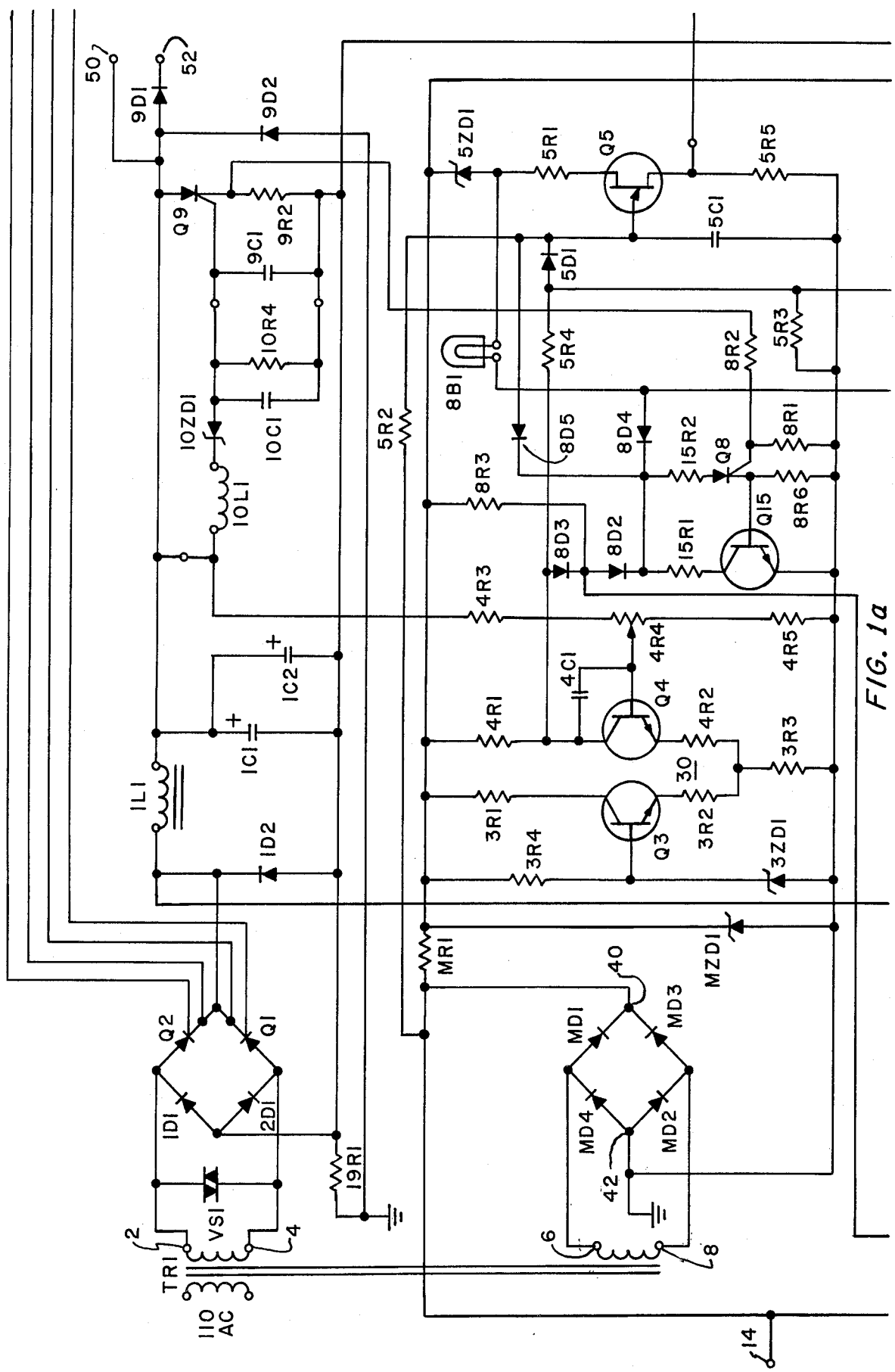
FIG. 1a shows the basic power supply circuits.

Referring to FIGS. 1a and 1b, it can be seen that the power supply may be identified as involving a full-wave-bridge phase-controlled Silicon Controlled Rectifier which operates in the manner disclosed in the following paragraphs.

The nominal input voltages to an exemplary power supply are 18.3 V across terminals 2 and 4, and 110 V across terminals 6 and 8 and terminals 10 and 12. The input voltage on terminals 2 and 4 is supplied from a secondary winding of the Power Transformer TR1. Transient protection for this input is provided by a varistor VS1. Any large negative or positive voltage spikes will be clipped by the varistor.

Figure 2A:
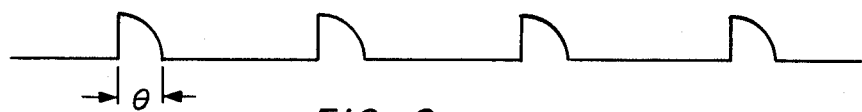
Figure 2B:
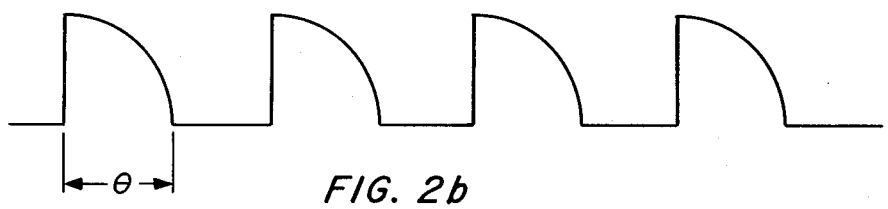

The A.C. input voltage is rectified by diodes 1D1 and 2D1. The output waveform of the bridge is determined by the conduction angle of the SCR's Q1 and Q2. The conduction angle in turn is determined by the load requirements, the Control Assembly (included in FIG. 1a) and the SCR Gate Assembly (FIG. 1b). The operation of these circuits will be discussed later. FIG. 2(a) indicates the waveform at each of the cathodes of the power SCR's Q1 and Q2 under no-load conditions. FIG. 2(b) shows the output waveforms under loaded conditions. As indicated, the conduction angle ($\theta$) increases with the load.

Diode 1D2 is called a Free Wheeling diode and provides a path for the inductive kick of choke coil 1L1. Without this diode the inductive kick would tend to maintain current flow through the SCR's and prevent turn-off (commutation).

The power supply filter consists of inductor 1L1 and capacitors 1C1 and 1C2. Its purpose is to smooth the waveforms shown in FIG. 2 and provide a constant D.C. voltage with minimum ripple. The current sense resistor 19R1 senses the amount of current flow to the load. When an overload occurs, the current will be limited to a nominal 25 amperes by the current limiting circuit which will be discussed later.

Overvoltage protection is provided by a silicon controlled rectifier (SCR), or thyristor, Q9 and its associated gate circuitry (including 10L1, 10ZD1 and 10R4). When the output voltage exceeds the Zener voltage rating of 10ZD1, a voltage will appear across 10R4. This voltage fires Q9 and the power supply output is shorted to ground. The potential appearing at the output of Q9 is applied across the resistor 9R2 and across the resistor 8R2 to the control terminal of thyristor Q8 causing it to fire. when Q8 fires it turns on Q15 which provides a path for lamp 8B1 which illuminates, indicating a failure.

Diode 9D1 is used to provide isolation between power supplies when Multi-Bay systems are connected in parallel. Diode 9D2 acts as a protective path in the event that a negative voltage is connected mistakenly to the output terminals 50 and 52.

Figure 3:
FIG. 3 shows the wave form of the pedestal voltage supplied by an oscillator for use in controlling the power SCR's.

The output of the supply is connected across a voltage divider 4R3, 4R4 and 4R5 to ground. The wiper arm of the potentiometer 4R4 is connected to the Differential Amplifier input (base of Q4). The Differential Amplifier is referenced to 3.6VDC±5% by zener diode 3ZD1 which is connected to the base of Q3. The potentiometer controls the output voltage level of the supply. Adjusting the potentiometer changes the voltage between the emitter and the base of Q4. The higher this voltage is the lower the collector voltage of Q4 will be. Lowering this voltage will increase the collector voltage (see FIG. 3). This voltage level when divided by 5R3 and 5R4 forms the "pedestal voltage" for the Unijunction Relaxation Oscillator (Q5).

Assume that 110VAC from the power transformer TR1 is connected via terminals 6 and 8 across the full wave diode bridge MD1, MD2, MD3, MD4, so that a positive rectified full-wave, formed of segments of a sine wave, occurs across the terminals 40, 42.

The output voltage of the full-wave diode bridge MD1, MD2, MD3, MD4 is connected through a large resistor 5R2 to the timing capacitor 5C1 of the Unijunction Relaxation Oscillator Q5. This capacitance causes a phase shift in the sinusoidal supply voltage and produced a cosine waveform.

The output of the diode bridge is also connected to a dropping resistor MR1. This resistance acts in conjunction with a 30V zener regulator diode MZD1. The supply voltage to the Differential Amplifier formed using transistors Q3 and Q4 is, therefore, a clipped sine wave of 30 volts ± 10 percent amplitude. The resistor 3R4 and the 3.6 volt zener diode 3ZD1 provide a reference voltage circuit for the differential amplifier. The cathode of the zener 3ZD1 is connected to the base of Q3. The base of the other NPN transistor Q4 in the differential amplifier 30 is connected to a proportional DC voltage divider formed by resistors 4R3, 4R4, and 4R5.

A capacitor 4C1 is connected between the base and collector of Q4 to feed back ripple which is out of phase with the power supply ripple voltage on the base of Q4 thereby canceling ripple from the collector of Q4 which otherwise would cause erratic firing of the main SCR's Q1 and Q2. One side of the divider is connected to the DC output of the supply at terminal 50 and the other side is connected to ground. The potentiometer 4R4 in the divider is adjusted to provide +5VDC at the supply output into a nominal load. When this occurs the voltage at the collector of the output transistor Q4 is divided by the resistor network 5R4, 5R3. This network of 5R4, 5R3 provides a pedestal voltage across the capacitor 5C1 as it is charged through the series diode 5D1. To this pedestal voltage the previously mentioned cosine wave on capacitor 5C1 is added over the resistor 5R1. Note that the R-C Time Constant of the pedestal is much less than that of the cosine ramp path. The pedestal, therefore, is established rapidly and the ramp increases very slowly. In other words the dv/dt of the ramp is much less than that of the pedestal.

The UJT relaxation oscillator supply voltage (Ebb) is approximately +20VDC in amplitude and is a modified sine wave. The result of using a cosine modified ramp and a sinusoidal supply voltage for all the supply modules is a linear output voltage transfer characteristic. That is, the D.C. output voltage changes linearly with respect to pedestal voltage changes.

Since the supply voltage of the UJT is sinusoidal, the relaxation oscillator is reset every half cycle when the sinusoidal voltage goes to zero. In this manner the trigger pulses from the oscillator to the SCR gates are synchronized to the A.C. line voltage. Note also that the UJT triggers several times during one half cycle. However, only the first trigger should gate the SCR's. When the cosine ramp reaches the trigger voltage of the UJT, it turns on and a positive pulse occurs at Base 1. This pulse is coupled by means of a 1:1:1 pulse transformer T2 to the gate circuits of the SCR's Q6 and Q7. Between Q6 and Q7, the SCR having a positive anode will fire. The resistor divider network 6R1, 6R2, 6R3 and 7R1, 7R2, 7R3 on each SCR gate assures that proper gate current and gate voltage for SCR firing is furnished to the gates and that the gate dissipation rating is not exceeded.

Firing one of the gate circuit SCR's results in a positive modified sine wave of approximately 18 volts peak amplitude appearing at its cathode. The conduction angle of the modified sine wave is determined by the relationship between the UJT output trigger and the start of the transformer secondary voltage wave form.

The time between the start of the secondary voltage and the trigger is determined by the intrinsic ratio of the UJT, the UJT supply voltage amplitude, the amplitude of the pedestal, the rate of change of the cosine ramp and the RC charging rate of a timing capacitor. When all these factors are correct and the input AC is 18VAC and the output voltage is +5VDC the conduction angle of the SCR should be approximately 90°.

Figure 5:
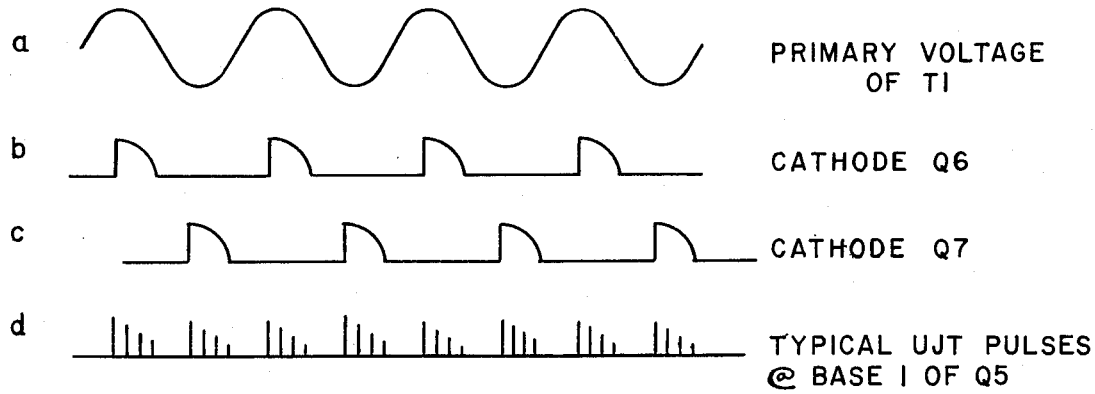
FIG. 5a illustrates the primary voltage applied to a transformer supplying the control SCR's and FIG. 5d illustrates pulses provided at the base of the oscillator.

The cathode voltage of the gate SCR is clipped by a 5.6V Zener 6ZD1 or 7ZD1 to insure that the maximum forward gate voltage and maximum gate current are not exceeded. This prevents excessive gate dissipation in the gate circuits of the main SCR's Q1 and Q2. The two gate SCR's Q6 and Q7 fire in an alternate manner. Therefore, the main SCR's fire on alternate half-cycles of the input AC waveform. This results in modified full wave rectification as shown in FIG. 5. The conduction angle of the output of the bridge is approximately 180°. The peak amplitude of the bridge output is approximately 20 volts when a typical forward drop of the semiconductors is considered.

The large inductor 1L1 (5 millihenries) which follows the bridge tends to maintain a holding current through diode 9 D1 when the line voltage goes to zero, preventing commutation. The Free Wheeling Diode 1D2 provides a by-pass for this current. The reverse recovery time of 1D2 is very fast to overcome the Ldi/dt effect of the inductor.

Figure 4A:
Figure 4B:
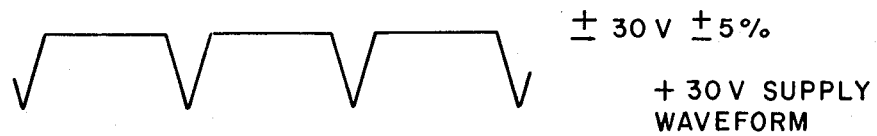

The UJT (Q5) circuit operates on a cosine-ramp and pedestal principle. The collector voltage of Q4 is divided by 5R4 and 5R3 to provide the pedestal voltage. Capacitor 5C1 charges rapidly to the pedestal voltage and then the current through 5R2 charges the capacitor at a much slower rate. This causes diode 5D1 to be back-biased and provides isolation between the voltage divider and the ramp voltage from 5R2 and terminal 14 (unzenered rectified A.C.). The voltage at the emitter of Q5 is similar to that shown in FIG. 4a. A +30V Zener supply voltage (regulated by MZD1) from terminal 40 is shown in FIG. 4b which provides synchronization between the line voltage and the charging of capacitor 5C1. Every half cycle of the input AC, capacitor 5C1 is discharged.

The output pulses from the unijunction circuit appear across the 10 ohm resistor 5R5 as pulses approximately 2 microseconds wide and seven volts in amplitude. There will be several of these pulses every half cycle. The pulses are coupled to the gates of Q6 and Q7 by the pulse transformer T2 and the resistor dividers 6R2 - 6R3 and 7R2 - 7R3, respectively. The phasing of T2 is such that both SCR gates go positive at the same time. However, the phasing of Trigger Control Transformer T1 allows only one SCR anode to be positive each half-cycle. Therefore, only that SCR whose anode is positive will conduct. The voltages under load conditions appearing at the cathodes of Q6 and Q7 are shown in FIGS. 5b, 5c with respect to the primary input of T1 in FIG. 5a and the Unijunction pulses in FIG. 5d.

Although several pulses appear from the UJT circuit each half cycle, only the first pulse each half cycle is important, since once an SCR (Q6 or Q7) is turned on it remains on regardless of what happens at the gate. The SCR is turned off when its anode goes negative and cannot be turned on again until its anode goes positive.

The output voltages at the cathodes of Q6 and Q7 are clipped in amplitude by Zener diodes 6ZD1 and 7ZD1. This protects the gate circuits of SCR's Q1 and Q2.

SCR's Q1 and Q2 will be fired on alternate half cycles of the input AC and the resulting voltage appears at 1L1 as shown in FIG. 1a. Therefore, it can be seen that the system operates on a closed-loop feed-back principle. As the current demand from the supply increases, the output voltage has a tendency to decrease. This change in voltage is fed to the Differential Amplifier 30, formed by Q3 and Q4. The output of the amplifier increases; raising the pedestal. This causes the unijunction transistor Q5 to fire earlier in the half-cycle and causes the gate SCR's (Q6, Q7) and the main SCR's (Q1, Q2) to conduct for a greater portion of the half-cycle. This increases the output voltage and brings the feedback loop into balance. Decreasing the load current will have the opposite effect.

Current Limiter

Figure 1C:
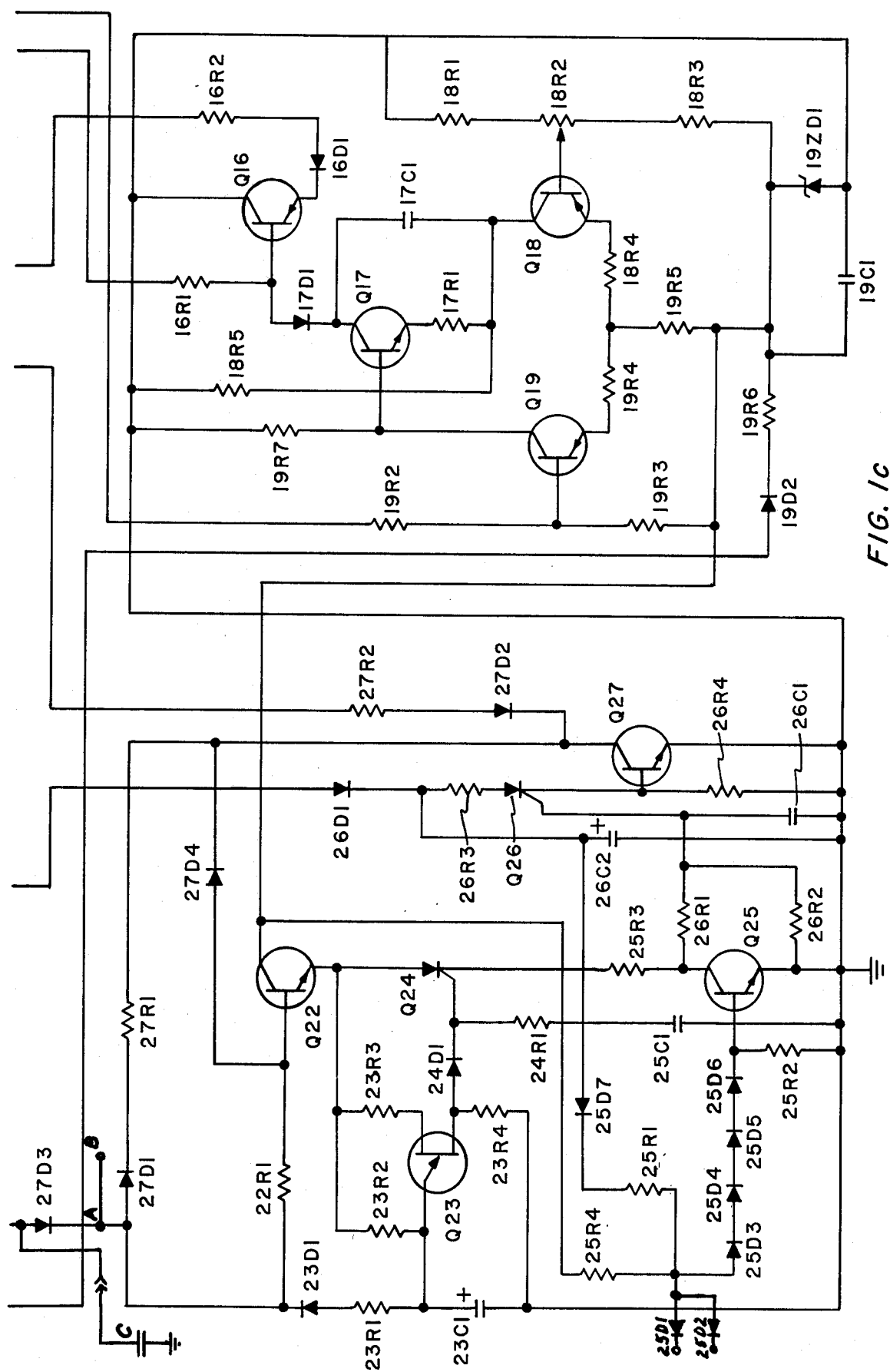
FIG. 1c illustrates a short circuit detector and a current limiter of interest in the practice of the invention.

Current limiting is provided by Q16, Q17, Q18 and Q19 in FIG. 1c. When the supply is loaded less than maximum, Q16 and Q17 are not conductive, and the control circuit operates as described in the preceding paragraphs. The potentiometer 18R2 is adjusted to the current threshold at which the current limiter will override the differential amplifier Q3, Q4. Adjusting the potentiometer clockwise decreases the maximum current threshold and vice versa. As the load increases, the voltage drop across 19R1 increases. This causes Q19 of the differential amplifier Q18, Q19 to conduct more, and decreases the conduction of Q18. The voltage of collector Q19 will increase while the voltage of collector Q18 will decrease. This will increase the conduction of inverter Q17. When the current threshold is reached, the collector voltage of Q17 will be less than the pedestal voltage at the node of 5R4 and 5R3, and emitter follower Q16 begins to conduct. This will lower the pedestal voltage by effectively shunting resistor 5R3. Reducing the pedestal voltage will limit the conduction angle of Q1 and Q2 which will limit the short circuit current to a nominal 120 percent of the supply current rating. If the overload is removed Q16 and Q17 will cutoff and the supply voltage will return to normal. 17C1 serves to slow the response time and prevent the current limiter from hunting.

A 14V Zener regulated supply (19ZD1) provides the operating current for the differential amplifier. In a particular supply application, this regulator also provides the current to operate the short circuit detector; and, in other supply applications it provides the current to operate the overvoltage crowbar interface circuit.

PRODUCTION OF VARIOUS OUTPUT POTENTIALS

The embodiment of the invention described thus far relates to a low voltage supply capable of delivering about 22 amps at a positive potential of 5 volts. Power sources having other current and voltage ratings require modification of the described circuits. AC input voltage levels are higher, of course, for higher voltage supplies. Bridge elements in the higher current rated supplies are naturally larger to handle the power requirements. The polarity of the output voltage of each source dictates the circuit orientation of the diode and SCR's in that source. The crowbar SCR gate circuit of −36 volt and −18 volt supplies requires transistor stages to provide a positive gate trigger between the gate-cathode circuit of the crowbar SCR. The interface between the crowbar SCR and the slow start discharge SCR (Q8) is direct for positive potentials; however, for negative supplies an inverter is required to provide a positive trigger voltage to fire Q8. Reference and breakdown Zener diode voltage ratings change from supply to supply because of different DC output voltages.

SHORT CIRCUIT DETECTOR

To protect each bay as well as a multi-bay system from being damaged in the event of a short, which could cause high current to flow through the buses, a short circuit detector is provided in each bay. Each detector has the capability of shutting down the system, in the event potential falls indicating the bus is shorted, until the short is removed. An exemplary short circuit detector includes elements associated with Q23, Q24, Q25, Q26 and Q27 in FIG. 1c. If the power supply is energized and the potential on the bus drops below a nominal value (2.5V in one example), the detector will determine this condition to be a short circuit, and shut down the system by discharging the slow start capacitor which is located externally of the supply as indicated at C.

When power is first applied to the system, the bus will have a potential of zero volts and the slow start capacitor will begin to charge through diode 8D3 and resistor 4R1. The slow start capacitor limits current that otherwise would flow at an excessive rate through the filter capacitors when power is first applied to the system by slowing down the establishment of the "pedestal voltage" for relaxation oscillator UJT (Q5). The UJT circuits, Q5 and Q23, remain off until the slow start capacitor is charged from the supply. As the power increases, Q1 and Q2 switch on quickly charging 26C2, Q22 is forward biased, and the unijunction transistor or UJT (Q23) relaxation oscillator will begin to time out. When the UJT times out (in approximately 2 seconds), SCR Q24 is fired enabling the short circuit detector by applying +14V to Q25. By this time the bus will reach its nominal value causing Q25 to saturate. This will clamp the +14 volts to ground and Q26 and Q27 will remain off allowing the system to operate.

Should the bus become grounded, the drive for Q25 will be clamped to ground, and the collector voltage will increase. SCR Q26 will fire and the stored charge on 26C2 will be applied via Q26 to switch Q27 "on". The slow start capacitor will start to discharge via the slow start multiple and the system will shut down until 26C2 discharges (approximately 4 seconds). The UJT oscillator Q23 will be reset via 23R1 and 23D1 along with Q24 and then Q26. The system will then again attempt another restart. If the grounded bus is cleared, system operation will be restored. If not, the system will again be shut down for 4 seconds.

In a switching system employing two or more switching bays a separate power supply and a separate short circuit detector are provided for each bay. The short circuit detectors may each provide protection to power supplies operating at two or more voltage as indicated by the diodes 25D1, 25D2 in FIG. 1c which may lead to voltages of +3V to +18.5V for example. The outputs of the power supplies are interconnected by a power distribution bus. The short circuit detectors are interconnected through terminals at A and B in FIG. 1c by a slow start discharge multiple. In operation, when Q27 discharges after detecting a short, it discharges all the slow start capacitors C through the multiple to the other power supply systems. This multiple completes connection through the point A in each short circuit detector causing the respective slow start capacitor coupled to each short circuit detector to discharge, thereby shutting down the entire system of two or more bays. Restart will then be attempted as indicated in the paragraph above.

While the principles of the invention have been described above in connection with specific apparatus and applications, it is to be understood that this description is made only by way of example and not as a limitation on the scope of the invention.

I claim:

1. A power supply having an input buss for supplying current to a plurality of loads, a plurality of individual power converting and controlling circuits, each such circuit interfacing between said input buss and a separate one of said loads, each said individual circuit comprising means for rectifying the voltage from said input buss, means in each individual circuit for limiting the current which may be drawn by that circuit from to a predetermined reduced to level the common buss, means in each circuit responsive to a drop in potential below a predetermined voltage level for causing said circuit to enter an open circuit condition for the supply of power to its load, means disposed externally of each circuit and responsive to anyone of said circuits entering an open circuit condition for causing the remaining circuits on said buss to enter an open circuit condition relative to their respective loads, and timing means operative automatically for restoring said circuits from the open circuit condition to again supply power to the loads.

2. A power supply as claimed in claim 1, in which said external means comprises a capacitor.

3. A power supply circuit as claimed in claim 2, in which said open circuit condition entering means includes further timing means operative after said capacitor has recharged to delay the start of detection of a short circuit condition at said load.

* * * * *